US009801000B2

(12) United States Patent
Shao (10) Patent No.: US 9,801,000 B2
(45) Date of Patent: Oct. 24, 2017

(54) AUTOMOBILE INTELLIGENT CONTROL INSTRUMENT AND AUTOMATIC INTELLIGENT MANAGEMENT SYSTEM BASED ON INTERNET OF THINGS

(71) Applicant: Chengdu Qinchuan Technology Development Co., Ltd., Chengdu (CN)

(72) Inventor: Zehua Shao, Chengdu (CN)

(73) Assignee: CHENGDU QINCHUAN TECHNOLOGY DEVELOPMENT CO., LTD., Chengdu (CN)

( * ) Notice: Subject to any disclaimer, the term of this patent is extended or adjusted under 35 U.S.C. 154(b) by 0 days.

(21) Appl. No.: 14/949,643

(22) Filed: Nov. 23, 2015

(65) Prior Publication Data

US 2016/0080890 A1    Mar. 17, 2016

Related U.S. Application Data

(63) Continuation of application No. PCT/CN2014/077141, filed on May 9, 2014.

(30) Foreign Application Priority Data

May 24, 2013   (CN) .......................... 2013 1 0197169

(51) Int. Cl.
*H04W 4/00* (2009.01)
*B60R 1/00* (2006.01)
(Continued)

(52) U.S. Cl.
CPC .............. *H04W 4/005* (2013.01); *B60R 1/00* (2013.01); *H04L 67/12* (2013.01); *H04W 4/046* (2013.01); *H04W 12/12* (2013.01)

(58) Field of Classification Search
CPC ............ H04L 29/06; G06F 7/00; B60R 25/10
(Continued)

(56) References Cited

U.S. PATENT DOCUMENTS

2009/0240427 A1* 9/2009 Siereveld .......... G01C 21/3469
  701/533
2010/0087986 A1* 4/2010 Lal ....................... B60R 16/023
  701/36

(Continued)

FOREIGN PATENT DOCUMENTS

CN    202080135    12/2011
CN    101898514    1/2012
(Continued)

OTHER PUBLICATIONS

International Search Report of PCT/CN2014/077141, dated Sep. 3, 2014, and English language translation, 4 pages total.

*Primary Examiner* — Thomas G Black
*Assistant Examiner* — Wae Louie
(74) *Attorney, Agent, or Firm* — Hamre, Schumann, Mueller & Larson, P.C.

(57) ABSTRACT

An automobile intelligent control instrument and an intelligent management system based on Internet of Things and belongs to an automobile instrument includes: a master controller of the automobile intelligent control instrument terminal based on the Internet of Things, wherein the master controller of the automobile intelligent control instrument terminal based on the Internet of Things is respectively accessed to many function modules inside an automobile and is further accessed to an information safety management module. The information safety management module is accessed to a signal base station, which is accessed to a remote control terminal. The master controller of the automobile intelligent control instrument terminal based on the Internet of Things transmits various data and control commands to the remote control terminal through the information safety management module and a mobile communication module.

11 Claims, 4 Drawing Sheets

(51) Int. Cl.
*H04W 4/04* (2009.01)
*H04W 12/12* (2009.01)
*H04L 29/08* (2006.01)

(58) Field of Classification Search
USPC .......... 701/533, 201; 340/426.14; 455/556.1;
713/171, 175, 168
See application file for complete search history.

(56) References Cited

U.S. PATENT DOCUMENTS

| | | | | |
|---|---|---|---|---|
| 2010/0123564 | A1* | 5/2010 | Grunhold | B60R 25/10 340/426.14 |
| 2013/0029595 | A1* | 1/2013 | Widmer | H04B 5/0031 455/39 |
| 2015/0229613 | A1* | 8/2015 | Baum | H04L 63/061 713/171 |
| 2016/0006723 | A1* | 1/2016 | Wilson | H04L 63/0823 713/175 |
| 2016/0013993 | A1* | 1/2016 | Chan | H04L 41/5074 370/216 |
| 2016/0171479 | A1* | 6/2016 | Prakash | G06Q 20/3226 705/44 |

FOREIGN PATENT DOCUMENTS

| | | |
|---|---|---|
| CN | 102749905 | 10/2012 |
| CN | 202904339 | 4/2013 |
| CN | 103309315 | 9/2013 |
| WO | 2011045750 | 4/2011 |

\* cited by examiner

DRAWINGS OF THE DISCLOSURE

AUTOMOBILE INTELLIGENT CONTROL INSTRUMENT AND AUTOMATIC INTELLIGENT MANAGEMENT SYSTEM BASED ON INTERNET OF THINGS

TECHNICAL FIELD

The invention relates to an automobile instrument; specifically, the invention mainly relates to an automobile intelligent control instrument and an automobile intelligent management system based on the Internet of Things.

BACKGROUND

At present, the automobile industry is in the era of scientific and technological innovation; various new technologies are continuously applied to automobiles and provide conditions for the realization of networked intelligent management of automobiles. Along with elevation of people's living standard, an increasing number of families begin to use automobiles, the usage amount of automobiles presents the increasing tendency in each year and automobiles have become an important part of people's lives. Therefore, unified management for systemized, intelligentized and networked of automobiles is needed to meet various requirements of automobile owners, national security departments, traffic management departments and public security departments. On one hand, automobile owners hope their own automobiles to have various intelligentized functions, such as antitheft, positioning and remote data access. On the other hand, with the increasing of the usage amount of automobiles, the traffic management departments hope to perform unified management on automobiles through the intelligentized automobile intelligent management system based on the Internet of Things. Thus, the traffic management departments master automobile running dynamics and position and track illegal vehicles. The public security departments hope to control automobiles through the intelligentized automobile intelligent management system based on the Internet of Things and rein illegal and criminal behaviors caused by the use of cars. The national security departments hope to control automobiles through the intelligentized automobile intelligent management system based on the Internet of Things and rein criminal behaviors threatening national security. However, in conventional automobile instruments, some function modules can only be simply combined and intelligentized and networked management cannot be realized. Therefore, many problems exist in the usage process of users and the management process of the traffic management departments. For example, because of the absence of the automobile intelligent management system based on the Internet of Things, automobile owners cannot acquire vehicle information through an effective way. With the increasing growth of the usage amount of automobiles, ordinary automobile instrument systems have no corresponding remote control functions, the traffic management departments cannot realize real-time monitoring and management of vehicles within management jurisdictions. When some vehicles break the law during driving, the traffic management departments cannot immediately acquire the illegal behaviors and cannot position and track the vehicles. On the other hand, after vehicles have been stolen, the public security departments cannot position and track stolen the vehicles and cannot control the traveling speed of the stolen vehicles and control engine systems; when criminal offenders make use of automobiles to threaten national security, the national security department cannot position and control the automobiles. The existence of the problems is not conducive to the national security departments to effectively deter behaviors of threatening national securities in use of automobiles, is not conducive to the traffic management departments and the public security departments to manage public road safety and will cause economic loss to automobile owners. With respect to the above problems, it is necessary to perform further research and improvement based on the present automobile instruments.

SUMMARY

In order to solve the above disadvantages, the invention provides the automobile intelligent control instrument and the automobile intelligent management system based on the Internet of Things and aims at solve the technical problems that the prior art is incapable of performing intelligentized management on vehicles and is incapable of remotely positioning and controlling the vehicles.

For the sake of solving the above technical problems, the invention adopts the following technical schemes:

On one hand, the invention provides the automobile intelligent control instrument based on the Internet of Things; the automobile intelligent control instrument based on the Internet of Things comprises a master controller of the automobile intelligent control instrument based on the Internet of Things. The master controller of the automobile intelligent control instrument based on the Internet of Things is respectively accessed to many function modules inside an automobile and is further accessed to an information safety management module. The information safety management module is accessed to a signal base station through a mobile communication module. The signal base station is accessed to a remote control terminal; the master controller of the automobile intelligent control instrument based on the Internet of Things transmits various data and control commands to the remote control terminals through the information safety management module and the mobile communication module.

The master controller of the automobile intelligent control instrument terminal based on the Internet of Things is used for receiving control commands from the remote control terminal through the information safety management module and the mobile communication module. The control commands are processed by a master control module inside the master controller of the automobile intelligent control instrument terminal based on the Internet of Things. The corresponding function modules are controlled according to the control commands; status information of each function module inside an automobile is acquired by an information acquisition device inside the master controller of the automobile intelligent control instrument based on the Internet of Things, processed by the master control module and transmitted to the remote control terminal through the information safety management module and the mobile communication module.

The master controller of the automobile intelligent control instrument based on the Internet of Things is further accessed to a positioning module and is used for acquiring the present actual position of the instrument through the positioning module and feeding back the present position information to the remote control terminal through the information safety management module and the mobile communication module.

The information safety management module is used for performing authentication and safety protection on various information commands between the mobile communication module and the master controller of the automobile intelligent control instrument based on the Internet of Things, identifies the identity of the remote control terminal according to built-in different protocol limiting conditions and many secret key programs of the information safety management module and judges whether the corresponding control command is transmitted to the master controller of the automobile intelligent control instrument based on the Internet of Things or not.

Preferably, the further technical scheme is that the information safety management module comprises a processor, a first data interface, a second data interface, a FLASH memory; the processor is respectively accessed to the first data interface, the second data interface and the FLASH memory.

The first data interface is used for performing unique data communication between the mobile communication module and the master controller of the automobile intelligent control instrument based on the Internet of Things, and transmitting the control commands to the processor when receiving the control commands from the mobile communication module.

The FLASH memory is used for storing control and file management programs inside the information safety management module; moreover, protocol limiting conditions and many different secret key programs are pre-stored inside the FLASH memory. When the information safety management module respectively exchanges data with different remote control terminals, the processor compares encryption keys of the control commands with many secret key programs built in the FLASH memory. Thus, the processor identifies identities of the remote control terminals, verifies the validness of the control commands under the present identities according to the protocol limiting conditions and judges whether transactions in the data are pre-treated or not.

The second data interface is used for performing data communication between the processor and the master controller of the automobile intelligent control instrument based on the Internet of Things.

When the control command from the first data interface is received, the processor is used for identifying the identity of the remote control terminal which sends the control command, judges whether an encrypted data package in the control command is acquired or not, and sends the corresponding operation command to the master controller of the automobile intelligent control instrument based on the Internet of Things through the second data interface according to the transactions contained in the data packet.

The further technical scheme is as follows: the control command is received from the first data interface; the processor identifies the identity of the remote control terminal according to the control command. When the identification result is judged legal, the processor decrypts the encrypted data packet in the control command and checks the integrality; or else, an initial state is reset.

After the control command passes the integrality checking, the effectiveness of the data is verified or else, the initial state is reset.

After the control command passes the integrality checking, the processor pre-treats the transactions contained in the control command, acquires corresponding return information from the master controller of the automobile intelligent control instrument based on the Internet of Things through the second data interface, encrypts the return information and returns to the mobile communication module through the first data interface. After the effectiveness is confirmed, the processor approves pretreatment results, stores relative operation information and sends an operation command to the master controller of the automobile intelligent control instrument based on the Internet of Things; or else, the processor gives up the pretreatment results or performs cache processing.

The further technical scheme is that the mobile communication module is one of a GPRS (General Packet Radio Service) communication module, a WCDMA (Wideband Code Division Multiple Access) communication module, a TD-SCDMA (Time Division-Synchronization Division Multiple Access); the mobile communication module is accessed to the remote control terminal via the signal base station through one of a GPRS network, a WCDMA network and a TD-SCDMA network.

The further technical scheme is that many relative function modules are any of a traveling speed control module, a rotating speed control module, an oil quantity monitor module, a water temperature monitor module, a tire pressure monitor module, an engine starting module, an in-vehicle temperature control module, an in-vehicle air quality control module, a vehicle door control module, a vehicle window control module, a vehicle lamp control module, a multimedia module and a fireproof monitor module.

The further technical scheme is that the master controller of the automobile intelligent control instrument based on the Internet of Things is further accessed to a liquid crystal display module; the master control module in the master controller of the automobile intelligent control instrument based on the Internet of Things processes the state information, acquired by the information acquisition device, of various function modules inside the automobile and then outputs the state information to the liquid crystal display module to display.

On the other hand, the invention further provides the automobile intelligent management system based on the Internet of Things. The management system comprises the remote control terminal, the signal base station and the automobile intelligent control instrument based on the Internet of Things according to any one of claims 1-6. The Internet of Things is at least composed of the automobile intelligent control instrument based on the Internet of Things, the signal base station and the remote control terminal. The automobile intelligent control instrument based on the Internet of Things is accessed to the remote control terminal through the signal base station, thus the automobile intelligent control instrument based on the Internet of Things exchanges data with the remote control terminal through a mobile communication network.

Preferably, the further technical scheme is that the remote control terminal comprises a computer-based automobile information management system, a service platform for automobile owners and a service platform for special departments. The service platform for automobile owner computers and the service platform for special departments are accessed to the computer-based automobile information management system and are used for respectively operating the computer-based automobile information management system. Moreover, a vehicle management department allocates corresponding operation authorities to the automobile owners and the special departments through the computer-based automobile information management system, thus the automobile owners and the special departments can perform different types of control on the automobile intelligent control instrument terminal based on the Internet of Things through the Internet.

The further technical scheme is that an engine number corresponding to an automobile with the automobile intelligent control instrument based on the Internet of Things is stored in the computer-based automobile information management system, and the engine number serves as an unique identity of a vehicle; the computer-based automobile information management system distinguishes different automobile intelligent control instruments based on the Internet of Things in the management system according to the different engine numbers.

Geographic information and traffic road condition information is arranged in the computer-based automobile information management system in advance and combines with the positioning module in the automobile intelligent control instrument terminal based on the Internet of Things; actual geographic information of the automobile intelligent control instrument terminal based on the Internet of Things, and driving road conditions at the present position are generated into voice and video navigation data to display or the navigation data is transmitted to the automobile intelligent control instrument terminal based on the Internet of Things by any one of the GPRS network, the WCDMA network and the TD-SCDMA network through the signal base station and is displayed on the liquid crystal display screen.

The further technical scheme is that computer-based automobile information management system comprises a system setting module, a basic information setting module, a service management module and a report management module. The service management module is at least used for managing operating registration service, change service, cancelling registration service, vehicle real-time positioning service, vehicle real-time control service, vehicle real-time information monitoring service, vehicle information safety service, driving recording service, bank service, ETC (Electronic Toll Collection) service, Alipay service and traveling route service.

Compared with the prior art, one of the beneficial effects in the invention is as follows: the master controller of the automobile intelligent control instrument based on the Internet of Things is accessed to the remote control terminal by the mobile communication module through the signal base station and is remotely controlled and monitored by the remote control terminal. Thus, the master controller serving as the management system for the remote control terminal is accessed to the Internet and provides a convenient management function to the automobile owners, the national security departments, the traffic management departments and the public security departments. Real-time positions of vehicles can be immediately known and correspondingly controlled through satellite positioning. Under the action of the information safety management module, distribution of corresponding control authorities to the remote control terminal can be realized, truth and validity of transmitted information in the Internet of Things are ensured, and the transmitted information is prevented from being interfered by external irrelevant information. A round-trip data stream is decrypted, thus data security is guaranteed; meanwhile, the automobile intelligent control instrument based on the Internet of Things is completely based on the electronic control manners of various function modules inside the present automobiles, can be directly installed in the original central control system of a vehicle and is applicable to various vehicle types. Moreover, the whole structure of the control system is simple; the automobile intelligent control instrument based on the Internet of Things completely relies on the framework of the Internet of Things, is established in use of the signal base station of a third-party communication operator and has wide application range.

DETAILED DESCRIPTION

The invention is further described in combination of the following figures.

Figure 1:
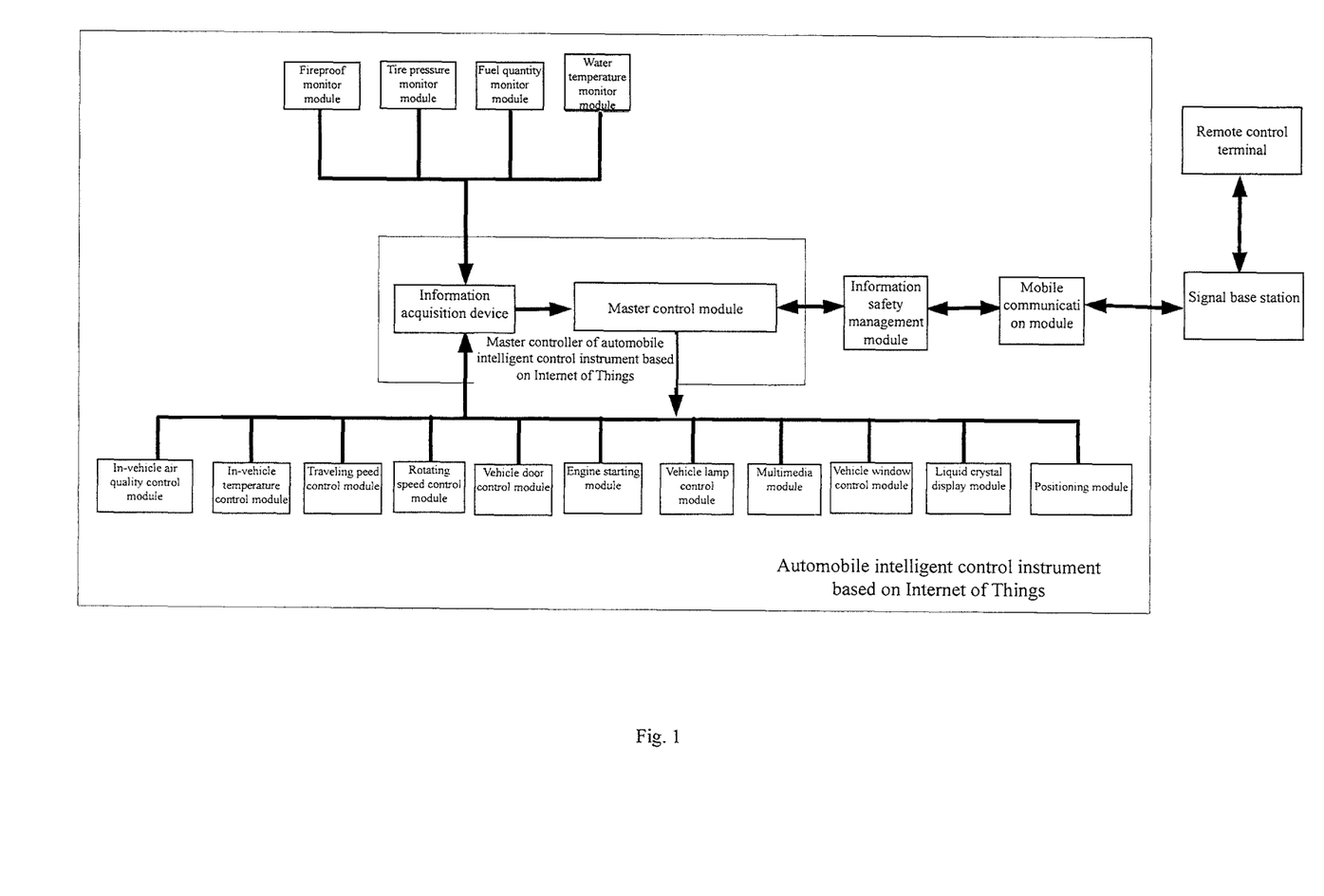
FIG. 1 is the structural diagram of the automobile intelligent control instrument based on the Internet of Things in one embodiment of the invention.

Referring to FIG. 1, one embodiment of the invention is that the automobile intelligent control instrument based on the Internet of Things comprises the master controller of the automobile intelligent control instrument based on the Internet of Things; the master controller of the automobile intelligent control instrument based on the Internet of Things is respectively accessed to many function modules inside an automobile; compared with the prior art, the automobile intelligent control instrument based on the Internet of Things has the functions of management of the Internet of Things, identity authentication, classified management, control of the Internet of Things, positioning of the Internet of Things, monitoring of the Internet of Things and information safety management; the detailed technical manner for realization of at least one function is as follows:

the master controller of the automobile intelligent control instrument based on the Internet of Things is further accessed to the information safety management module; the information safety management module is accessed to the signal base station through the mobile communication module and is accessed to the remote control terminal through the signal base station; the master controller of the automobile intelligent control instrument based on the Internet of Things transmits various data and control commands with the remote control terminal through the information safety management module and the mobile communication module;

the master controller of the automobile intelligent control instrument based on the Internet of Things is used for receiving the control commands from the remote control terminal through the information safety management module and the mobile communication module; the control commands are processed by the master control module inside the master controller of the automobile intelligent control instrument based on the Internet of Things; the corresponding function modules are controlled according to the control commands; moreover, the information acquisition device inside the master controller of the automobile intelligent control instrument based on the Internet of Things acquires state information of various function modules inside the automobile; the state information is processed by the master control module and transmitted to the remote control terminal through the information safety management module and the mobile communication module;

the master controller of the automobile intelligent control instrument based on the Internet of Things is further accessed to the positioning modules (such as a GPS global positioning system module and a BNSS Beidou navigation system module); the master controller of the automobile intelligent control instrument based on the Internet of Things is used for acquiring the present actual position of the instrument through the positioning modules and feeding back the present position information to the remote control terminal through the information safety management module and the mobile communication module;

the information safety management module is used for performing identification and safety protection on various information between the mobile communication module and the master controller of the automobile intelligent control instrument based on the Internet of Things, identifies the identity of the remote control terminal according to built-in different protocol limiting conditions and many secret key programs of the information safety management module and judges whether the corresponding control command is transmitted to the master controller of the automobile intelligent control instrument based on the Internet of Things or not.

Further, the master controller of the automobile intelligent control instrument based on the Internet of Things is accessed to the liquid crystal display module; the master control module in the master controller of the automobile intelligent control instrument based on the Internet of Things processes the state information, acquired by the information acquisition device, of various function modules inside the automobile and then outputs the state information to the liquid crystal display module to display.

Figure 2:
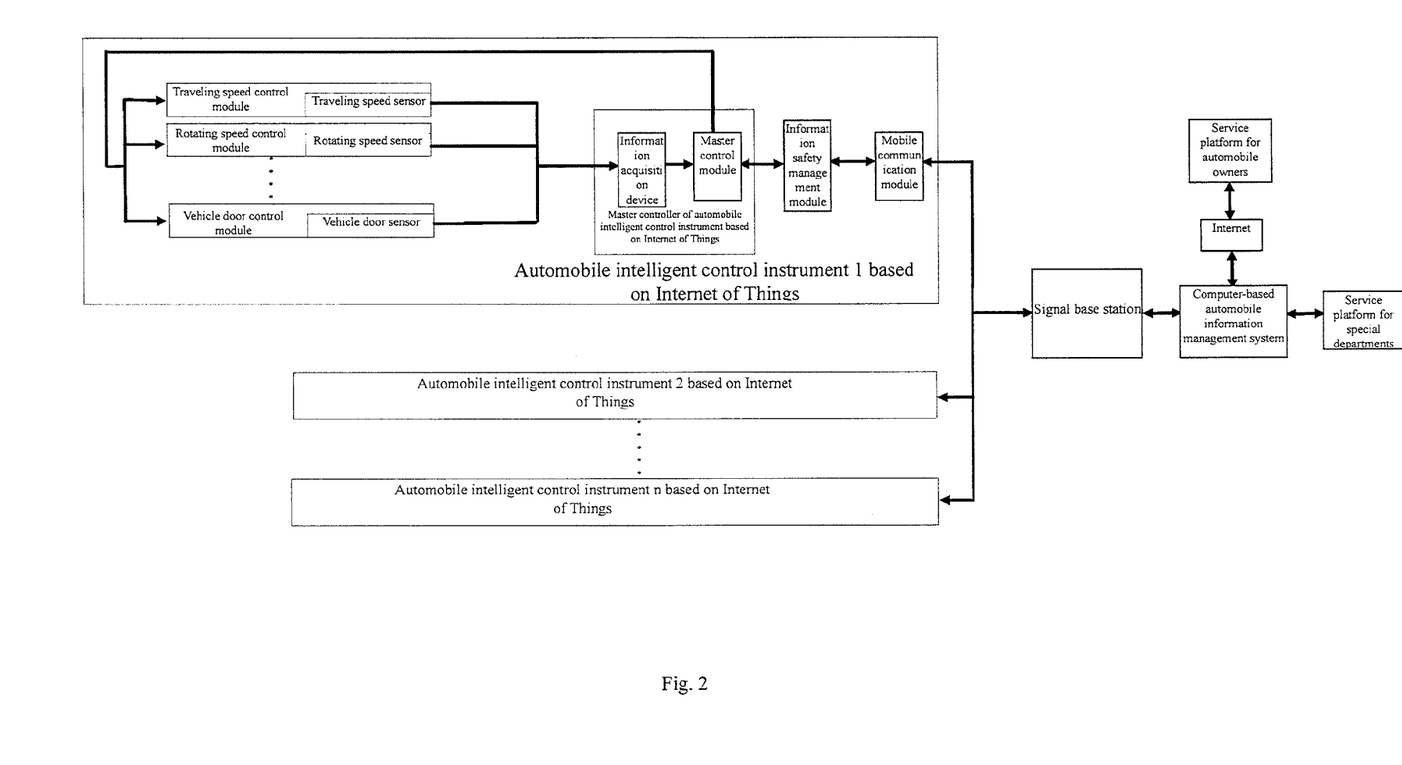
FIG. 2 is the structural diagram of the automobile intelligent management system based on the Internet of Things in the other embodiment of the invention.

Referring to FIG. 2, in the preferable embodiment for solving the above technical problems, in order to improve the safety of data transmission between the remote control terminal and the master controller of the automobile intelligent control instrument based on the Internet of Things and facilitate control for authorities of the remote control terminal, the information safety management module shall comprise the processor, the first data interface, the second data interface and the FLASH memory; the processor is respectively accessed to the first data interface, the second data interface and the FLASH memory, wherein the first data interface is used for performing unique data communication between the mobile communication module and the master controller of the automobile intelligent control instrument based on the Internet of Things; after receiving the control commands from the mobile communication module, the first data interface transmits the control commands to the processor;

the FLASH memory is used for storing the control and file management programs inside the information safety management module; moreover, protocol limiting conditions and many different secret key programs are pre-stored inside the FLASH memory; when the information safety management module respectively exchanges data with different remote control terminals, the processor compares encryption keys of the control commands with many secret key programs built in the FLASH memory, thus the processor identifies identities of the remote control terminals, verifies the validness of the control commands under the present identities according to the protocol limiting conditions and judges whether transactions in the data are pre-treated or not; and the pre-treatment results can be stored through an EEPROM (Electrically Erasable Programmable Read-Only Memory) memory.

The second data interface is used for performing data communication between the processor and the master controller of the automobile intelligent control instrument based on the Internet of Things;

while receiving the control commands from the first data interface, the processor is used for identifying the identity of the remote control terminal which sends the control command, judges whether an encrypted data package in the control command is acquired or not, and sends the corresponding operation command to the master controller of the automobile intelligent control instrument based on the Internet of Things through the second data interface according to the transactions contained in the data packet.

Further, while receiving the control commands from the first data interface, the processor is used for identifying the identity of the remote control terminal according to the control commands; when the identification result is judged to be legal, the processor decrypts the encrypted data packet in the control command and checks the integrality; or else, an initial state is reset;

after the control command passes the integrality checking, the effectiveness of the data is verified; or else, the initial state is reset;

after the control command passes the integrality checking, the processor pre-treats the transactions contained in the control command, acquires corresponding return information from the master controller of the automobile intelligent control instrument based on the Internet of Things through the second data interface, encrypts the return information and returns to the mobile communication module through the first data interface; after the effectiveness is confirmed, the processor approves pretreatment results, stores relative operation information and sends an operation command to the master controller of the automobile intelligent control instrument based on the Internet of Things; or else, the processor gives up the pretreatment results or performs cache processing.

In addition, an encryption module is further arranged inside the information safety management module; the encryption module is accessed to the processor and used for performing multi-stage encryption on data exchange among the information safety management module, the mobile communication module and the master controller of the automobile intelligent control instrument based on the Internet of Things; moreover, the encryption module assists the processor to perform identity authentication on the data encryption key of the remote control terminal. Referring to the encryption manners with higher safety in the prior art, an AES (Advanced Encryption Standard in cryptology) or 3DES (Triple Data Encryption Algorithm) is preferably chosen to encrypt and decrypt the data and the control commands between the encryption module and the information safety management module.

As shown in FIG. 1, referring to the conventional mobile communication networks in the prior art, the mobile communication module in the embodiment can be chosen from the GPRS communication module, the WCDMA communication module and the TD-SCDMA communication module; the mobile communication module is accessed to the remote control terminal through the signal base station of any one of the GPRS network, the WCDMA network and the TD-SCDMA network.

However, as the above mentioned, the master controller of the automobile intelligent control instrument based on the Internet of Things is respectively accessed to many function modules inside an automobile; based on the present electronic control module inside the automobile, various function interfaces for operating the automobile are arranged in the information acquisition device and the master control module of the master controller of the automobile intelligent control instrument based on the Internet of Things; the function interfaces can be accessed to the traveling speed control module, the rotating speed control module, the fuel quantity monitor module, the water temperature monitor module, the tire pressure monitor module, the engine starting module, the in-vehicle temperature control module, the in-vehicle air quality control module, the vehicle door control module, the vehicle window control module, the vehicle lamp control module, the multimedia module and the fireproof monitor module and the like. Different sensors are arranged inside the majority of the above modules; for example, a traveling speed sensor is contained inside the speed control module; a rotating speed sensor is contained inside the rotating speed control module; a vehicle door sensor is arranged inside the vehicle door control module; each module is used for finishing different controls to the automobile under the control of the master controller of the automobile intelligent control instrument based on the Internet of Things; the specific content is as follows:

the speed control module is used for controlling the traveling speed of the automobile; the rotating speed control module is used for controlling the output power through controlling the rotating speed of a crankshaft; the fuel quantity monitor module is used for monitoring the fuel quantity in a fuel tank; the water temperature monitor module is used for measuring water temperature information inside the equipment through a water temperature sensor; the tire pressure monitor module is used for measuring tire pressure through a built-in tire pressure monitor; the engine starting module is used for controlling an ignition signal, controlling fuel injection and starting a motor to drive the engine to rotate through the master controller of the automobile intelligent control instrument based on the Internet of Things; the in-vehicle temperature control module is used for real-timely controlling temperature and humidity inside the present in-vehicle environment; the in-vehicle air quality control module is used for detecting the present in-vehicle air quality; the fireproof monitor module is used for detecting whether flammable gas exists inside the vehicle or not; the vehicle door detection module is used for performing safety control on the vehicle doors; the vehicle lamp control module is used for controlling front and rear lamps; the vehicle window control module is used for controlling shutdown and starting of vehicle windows; the display module is used for displaying various relevant information; the multimedia module is used for improving diversity of automotive functions and has a voice prompting function, an image display function and a song and video playing function.

Figure 3:
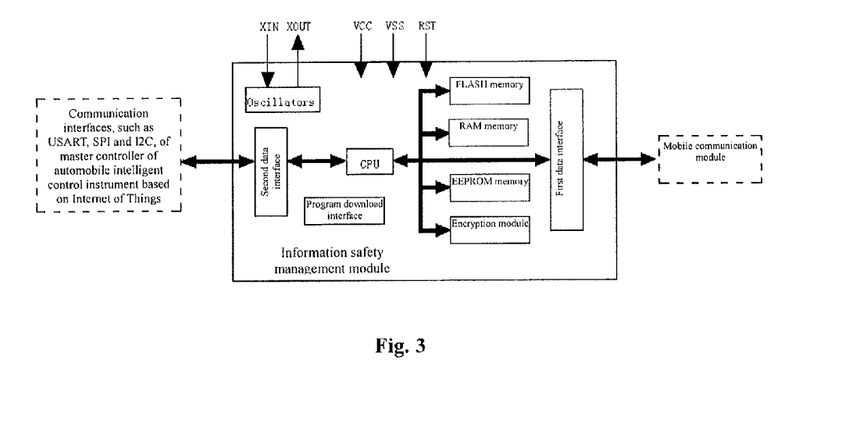
FIG. 3 is the diagram of the information safety management module in the other embodiment of the invention.

Referring to FIG. 3, the other embodiment of the invention is the automobile intelligent management system based on the Internet of Things, which matches with the above automobile intelligent instrument; the management system comprises the remote control terminal, the signal base station and many automobile intelligent control instrument terminals based on the Internet of Things in the above embodiment; the Internet of Things is composed of the automobile intelligent control instrument based on the Internet of Things, and the remote control terminal; the automobile intelligent control instrument based on the Internet of Things is accessed to the remote control terminal through the signal base station, thus the automobile intelligent control instrument based on the Internet of Things exchanges data with the remote control terminal through the mobile communication network.

As shown in FIG. 3, according to the other embodiment of the invention, the remote control terminal comprises the computer-based automobile information management system, a service platform for automobile owners and a service platform for special departments (such as traffic management departments, public security departments and national security departments); the service platform for automobile owners computer and the service platform for special departments are accessed to the computer-based automobile information management system and are used for respectively operating the computer-based automobile information management system; moreover, a vehicle management department allocates corresponding operation authorities to the automobile owners and the special departments through the computer-based automobile information management system, thus the automobile owners and the special departments can perform different types of control on the automobile intelligent control instrument terminal based on the Internet of Things through the Internet.

More importantly, geographic information and traffic road condition information is arranged in the computer-based automobile information management system in advance and combines with the positioning modules (such as GPS and BNSS) in the automobile intelligent control instrument terminal based on the Internet of Things; actual geographic information of the automobile intelligent control instrument terminal based on the Internet of Things, and driving road conditions at the present position are generated into voice and video navigation data to display; or the navigation data is transmitted to the automobile intelligent control instrument terminal based on the Internet of Things by any one of the GPRS network, the WCDMA network and the TD-SCDMA network through the signal base station and is displayed on the liquid crystal display screen.

Meanwhile, for facilitating respective management on many instrument terminals in the management system, the instrument terminals shall be distinguished with unique identification codes; for facilitating realization, the engine number corresponding to the automobile of the automobile intelligent control instrument terminal based on the Internet of Things can be directly stored in the computer-based automobile information management system, and the engine number serves as the unique identity of the vehicle; the computer-based automobile information management system distinguishes different automobile intelligent control instruments based on the Internet of Things in the management system according to the different engine numbers; the corresponding engine number can be searched from the computer-based automobile information management system through other basic information, thus different automobile intelligent control instruments based on the Internet of Things can be distinguished.

Figure 4:
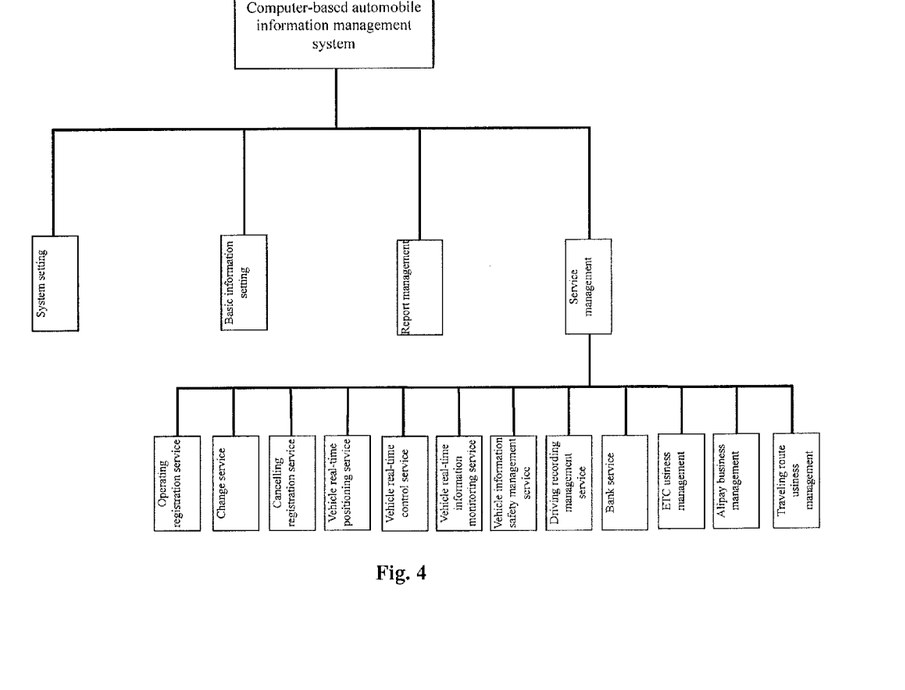
FIG. 4 is the structural diagram of the modules of the computer-based automobile information management system in the other embodiment of the invention.

As shown in FIG. 4, in the other embodiment of the invention, the system setting module, the basic information setting module, the service management module and the report management module shall be set inside the computer-based automobile information management system; the service management module is at least used for managing operating registration service, change service, cancelling registration service, vehicle real-time positioning service, vehicle real-time control service, vehicle real-time information monitoring service, vehicle information safety service, driving recording service, bank service, ETC (Electronic Toll Collection) service, Alipay service and traveling route service.

The automobile management based on the Internet of Things is finished through the above service management; for example, identity information of automobile owners, engine numbers of automobiles and license plate information are registered through the operating registration service management; through the real-time positioning services of vehicles, real-time positions of automobiles can be acquired in real time for the automobile owners, the national security departments, the traffic management department and the public security departments to use; the automobile intelligent management system based on the Internet of Things can provide references of traffic conditions of traveling routes for automobile owners through the integration of relative vehicle information and traffic road condition information; through the vehicle real-time control service, the automobile owners, the national security departments, the traffic management department and the public security departments can send the control commands within the approved authority range so as to control the automobiles; a vehicle window locking command is sent to the vehicle window control module so as to close the windows; a speed-limited control command is sent to the rotating speed control module so as to control the traveling speed; an engine control command is sent to the engine starting module so as to realize control on the engine state. Through the vehicle real-time information monitoring service, the automobile owners, the national security departments, the traffic management departments and the public security departments can real-timely monitor vehicle information and vehicle states so as to master relevant of automobiles. Through the information safety management service, different secret keys for the automobile owners, the national security departments, the traffic management departments and the public security departments can be set in use of the automobile intelligent management system based on the Internet of Things; the classified management of the automobile intelligent management system based on the Internet of Things can be realized by utilizing different secret keys; moreover, the 3DES/AES multi-stage encryption manner is adopted, thus safety of the secret keys is higher; the secret keys can be real-timely updated through a program download interface on the information safety management module, thus risks caused by key exposure can be avoided; truth, accuracy and integrity of transmitted data can be guaranteed.

Figure 5:
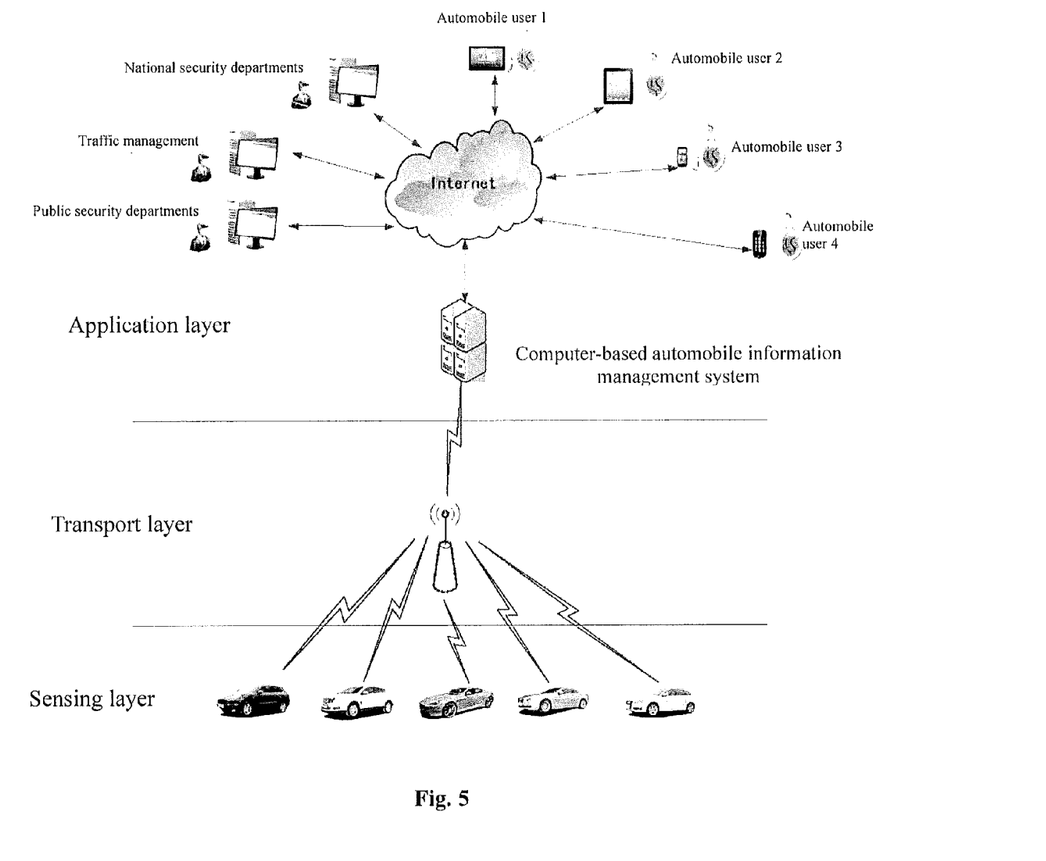
FIG. 5 is the topological structure diagram of the automobile intelligent management system based on the Internet of Things in the embodiment of the invention.

As shown in FIG. 5, in the whole automobile intelligent management system based on the Internet of Things, a sensing layer (automobiles) is connected with an application layer through a transmission layer (mobile communication networks such as GPRS, WCDMA and TD-SCDMA). The application layer comprises the automobile intelligent management system based on the Internet of Things, various users of special departments and various automobile users.

In actual application, automobile users can use networked terminal devices such as mobile phones, IPAD and computers to access the automobile intelligent management system based on the Internet of Things through the above service platform for automobile users. The automobile users can send control commands to the master controller of the automobile intelligent control instrument based on the Internet of Things through the mobile communication module. After receiving the control commands, the master controller of the automobile intelligent control instrument based on the Internet of Things identifies users' identities and relevant operating authorizations through the internal information safety management module. After the authorizations have been passed, the master controller executes relevant operation and returns operation results to the automobile intelligent management system based on the Internet of Things. The automobile intelligent management system based on the Internet of Things sends the operation results to appointed users, thus the users can remotely control automobiles and acquire the present information of the automobiles.

When an automobile is traveling, the automobile intelligent control instrument based on the Internet of Things acquires real-time information of the vehicle through the information acquisition device and uploads the present status of the vehicle to the automobile intelligent management system based on the Internet of Things through the communication module. The traffic management departments can acquire the running state of the vehicle through the automobile intelligent management system based on the Internet of Things, analyze the information data and judge whether vehicles within the jurisdictions travel at overspeed, run the red light and conversely run. If yes, the traffic management departments send pre-warning voice prompts to achieve the purpose of reducing traffic accidents. When an automobile is stolen, the automobile owner can access the automobile intelligent management system based on the Internet of Things and sends a traveling speed control command to the automobile the first time. After receiving and checking the command, the master controller of the automobile intelligent control instrument based on the Internet of Things performs relevant operations; meanwhile, the user notifies the traffic management departments and calls the police, thus huge economic loss caused by the stolen vehicle can be avoided. The public security departments can position the position of the vehicle and send a speed-limited control command. After receiving the command, the automobile intelligent control instrument based on the Internet of Things controls the running of the vehicle and forces criminal offenders to give up the vehicle; the public security departments can immediately arrive at the site to handle the stolen vehicle, the recovery of the stolen vehicle is facilitated.

As the above mentioned, through the above technical manners, the realized management functions of the Internet of Things comprise a system setting function, a basic information setting function, a service management function and a report management function in the computer-based information management system.

The identity authentication function is that an engine number corresponding to an automobile with the automobile intelligent control instrument based on the Internet of Things is stored in the computer-based automobile information management system, and the engine number serves as an unique identity of a vehicle; the computer-based automobile information management system distinguishes different automobile intelligent control instruments based on the Internet of Things in the management system according to the different engine numbers, and searches the corresponding engine number through the other basic information to distinguish different automobile intelligent control instruments based on the Internet of Thing.

The classified management function is that automobile users access the computer-based automobile information management system through the service platform for automobile users and the service platform for special departments and operate the computer-based automobile information management system. Moreover, the vehicle management departments distribute corresponding operation authorities to the automobile owners and the special departments, thus different users can perform different types of control on the master controller of the automobile intelligent control instrument based on the Internet of Things through the Internet.

The control function of the Internet of Things is that control commands are sent to the master controller of the automobile intelligent control instrument based on the Internet of Things through the wireless communication module; after receiving the commands, the master controller of the automobile intelligent control instrument based on the Internet of Things identifies users' identities and relevant operating authorizations through the internal information safety management module; after the authorizations have been passed, the master controller executes relevant operation and returns operation results to the automobile intelligent management system based on the Internet of Things; the automobile intelligent management system based on the Internet of Things sends the operation results to appointed users, thus the users can remotely control automobiles and acquire the present information of the automobiles.

The realization process of the positioning function of the Internet of Things is as follows: the positioning module is arranged inside the automobile intelligent control instrument based on the Internet of Things; the automobile intelligent management system based on the Internet of Things real-timely acquires position information of automobiles and combines with geographic information and traffic road condition information to form various traveling road conditions and position information; for example, through the information of the positioning system, the automobile intelligent management system based on the Internet of Things can real-timely acquire real-time positions of automobiles for the automobile owners, the traffic management departments and the public security departments to use; the automobile intelligent management system based on the Internet of Things can provide references of traffic conditions of traveling routes for automobile owners through the integration of relative vehicle information and traffic road condition information;

The monitoring function of the Internet of Things is that the automobile intelligent management system based on the Internet of Things real-timely monitors vehicle information and vehicle states through the communication module.

By virtue of the difference with the prior part, the invention has the following characteristics:

(1) when a vehicle of an automobile owner is stolen, the stolen vehicle can be rapidly positioned through the vehicle GPS positioning information acquired by the automobile intelligent management system based on the Internet of Things and a real-time position of the vehicle can be known;

(2) the traffic management departments can acquire vehicle information to establish a remote monitor, diagnosis and control system through the automobile intelligent management system based on the Internet of Things, real-timely monitor the illegal acts such as excessive speed, converse running, running the red light and illegally turning around, and track and position the vehicles;

(3) the automobile intelligent management system based on the Internet of Things acquires the vehicle traveling information, combines with the present road condition image system to establish an all-around remote road condition diagnosis control system, real-timely positions traveling positions of the automobile owners and provides smooth traveling routes to the automobile owners;

(4) the public rescue department can depend on the vehicle information acquired by the automobile intelligent management system based on the Internet of Things and establish a new rescue service system; the GPS positioning information is utilized to realize efficiency connection with emergency rescue, thus various prompt service requests such as repairing of flat tires and refueling can be guaranteed; when an automobile owner encounters an emergency situation or a serious car accident happens, the automobile user can be rescued within the minimum time, thus the automobile intelligent management system based on the Internet of Things provides guidance to the traffic management department to arrive the site within the minimum time and dredge the traffic;

(5) the public security departments can take corresponding measures to a stolen vehicle in the authorized situation, comprehensively control the vehicle and force the criminal offenders to stop using the vehicle; for example, the public security departments control the running speed of the vehicle or even force the vehicle to stop in position, thus the recovery of the stolen vehicle is realized;

(6) the public security departments can real-timely monitor seriously violation vehicles, take corresponding measures to limit the violations of the vehicles and perform take-over control on the vehicles;

(7) when a vehicle of an automobile owner is stolen, control measures can be adopted the first time to limit the running speed and stop the moving of the vehicle, thus recovery of the vehicle is facilitated;

(8) automobile owners can acquire road congestion information through the automobile intelligent management system based on the Internet of Things, real-timely know the road conditions to their destinations; before traveling, the automobile users can dispatch quick paths and choose the road sections without traffic accidents or traffic jams to travel, thus automobile users are prevented from being trapped on the congested roads by blindness of travel, and waste of valuable time of the automobile users is avoided;

(9) convenience can be provided to the automobile users and the relevant business departments through bank service, ETC service, expressway payment service.

(10) the information safety management module adopts corresponding secret keys to encrypt and decrypt the data exchanged between automobiles and the automobile intelligent management system based on the Internet of Things, thus data during transmission is prevented from being decoded and amended and automobiles are prevented from being maliciously controlled.

Besides the above mentioned, one embodiment, the other embodiment and the embodiment discussed in the description are that specific characteristics, structures or features described in combination of the embodiment are contained in at least one embodiment of the general description of the invention. The same expression in many places of the description may mean different embodiments. Further, when one specific characteristic, structure or feature is described in combination of any embodiment, the other embodiments are combined to realize the characteristic, structure or feature and are contained in the scope of the invention.

Although many explanatory embodiments in the invention are referred to describe the invention, people shall understand that technicians in the field can design many other amending and execution manners, which will be contained in the scope of the principles and spirits disclosed by the invention. More specifically, within the scope of the disclosure, the drawings and the claims of the invention, constituent elements and/or layouts of the combination layout can be differently deformed and modified. Besides the constituent elements and/or layouts are deformed and modified, other purposes are obvious for the technicians in this field.

What is claimed is:

1. An automobile intelligent control instrument, comprising:
   a master controller including a master control module and an information acquisition device;
   a plurality of function modules of an automobile, the plurality of function modules being communicatively connected to the master controller;
   a mobile communication module;
   an information safety management module communicatively connectable to a signal base station through the mobile communication module and electronically accessible from a remote control terminal through the signal base station,
   wherein the master controller transmits data and control commands to the remote control terminal through the information safety management module and the mobile communication module, the master controller receives control commands from the remote control terminal through the information safety management module and the mobile communication module, the control commands are processed by the master control module, the plurality of function modules being controlled according to the control commands,
   status information of the plurality of function modules of the automobile is acquired by the information acquisition device, processed by the master control module, and transmitted to the remote control terminal through the information safety management module and the mobile communication module,
   the master controller is communicatively connected to a positioning module that acquires a present actual position of the automobile intelligent control instrument though the positioning module and transmits the present position information to the remote control terminal through the information safety management module and the mobile communication module, and
   the information safety management module authenticates and controls various information commands between the mobile communication module and the master controller, identifies the identity of the remote control terminal according to different built-in protocol limiting conditions and secret key programs, and determines whether the corresponding control command is transmitted to the master controller.

2. The automobile intelligent control instrument according to claim 1, wherein the information safety management module comprises:
   a processor, a first data interface, a second data interface, and a FLASH memory;
   the processor is communicatively connected to the first data interface, the second data interface and the FLASH memory;
   the first data interface performs data communication between the mobile communication module and the master controller and transmits the control commands to the processor in response to receiving the control commands from the mobile communication module;
   the FLASH memory stores control and file management programs inside the information safety management module, and the FLASH memory stores the different built-in protocol limiting conditions and secret key programs;
   when the information safety management module exchanges data with the remote control terminal, the processor compares encryption keys associated with the control commands with the secret key programs stored in the FLASH memory to verify an identity of the remote control terminal, verifies the validness of the control commands according to the protocol liming conditions, and determines whether transactions in the data are pre-treated or not;
   the second data interface performs data communication between the processor and the master controller; when the control command from the first data interface is received, the processor identifies the identity of the remote control terminal associated with the control command, determines whether an encrypted data package in the control command is acquired, and sends the corresponding operation command to the master controller through the second data interface according to the transactions contained in the data packet.

3. The automobile intelligent control instrument according to claim 2, wherein when the control command is received from the first data interface, the processor identifies the identity of the remote control terminal according to the control command;
   when the identification result is judged to be valid, the processor decrypts the encrypted data packet in the control command and checks the integrality; or else, an initial state is reset;
   after the control command passes the integrality checking, the effectiveness of the data is verified; or else, the initial state is reset;
   after the control command passes the integrality checking, the processor pre-treats the transactions contained in the control command, acquires corresponding return information from the master controller through the second data interface, encrypts the return information, and returns to the mobile communication module through the first data interface;
   after the effectiveness is confirmed, the processor approves pretreatment results, stores relative operation information, and sends an operation command to the master controller, or else, the processor gives up the pretreatment results or performs cache processing.

4. The automobile intelligent control instrument according to claim 1, wherein the mobile communication module is one of a General Packet Radio Service (GPRS) communication module, a Wideband Code Division Multiple Access (WCDMA) communication module, and a Time Division-Synchronization Division Multiple Access (TD-SCDMA); and
   the mobile communication module is communicatively connected to the remote control terminal via the signal base station through one of a GPRS network, a WCDMA network, and a TD-SCDMA network.

5. The automobile intelligent control instrument according to claim 4, wherein the plurality of function modules include any of a traveling speed control module, a rotating speed control module, a fuel quantity monitor module, a water temperature monitor module, a tire pressure monitor module, an engine starting module, an in-vehicle temperature control module, an in-vehicle air quality control module, a vehicle door control module, a vehicle window control module, a vehicle lamp control module, a multimedia module and a fireproof monitor module.

6. The automobile intelligent control instrument according to claim 1, wherein the master controller is communicatively coupled to a liquid crystal display module;

the master control module processes the state information acquired by the information acquisition device, of the plurality of function modules of the automobile, and then displays the state information via the liquid crystal display module.

7. An automobile intelligent management system, comprising:
 a remote control terminal, a signal base station, and an automobile intelligent control instrument according to claim 1, wherein the automobile intelligent control instrument is accessible from the remote control terminal through the signal base station, thereby exchanging data with the remote control terminal through a mobile communication network.

8. The automobile intelligent management system according to claim 7, wherein the remote control terminal comprises a computer-based automobile information management system, a service platform for automobile owners, and a service platform for special departments,
 wherein the service platform for automobile owners and the service platform for special departments are accessed via the computer-based automobile information management system and are used for respectively operating the computer-based automobile information management system, and wherein operation authorities are allocated to the automobile owners and the special departments through the computer-based automobile information management system, the automobile owners and the special departments having different types of control for the automobile intelligent control instrument through the Internet.

9. The automobile intelligent management system according to claim 8, wherein an engine number corresponding to an automobile is stored in the computer-based automobile information management system, the engine number being a unique identity of a vehicle, wherein different automobile intelligent control instruments are distinguished based on the different engine numbers.

10. The automobile intelligent management system according to claim 8, wherein geographic information and traffic road condition information is stored in the computer-based automobile information management system, actual geographic information of the automobile intelligent control instrument terminal and driving road conditions at a present position are generated into voice and video navigation data to display or navigation data is transmitted to the automobile intelligent control instrument terminal by any one of a General Packet Radio Service (GPRS) network, a Wideband Code Division Multiple Access (WCDMA) network, and a Time Division-Synchronization Division Multiple Access (TD-SCDMA) network through the signal base station and is displayed on a liquid crystal display.

11. The automobile intelligent management system according to claim 7, wherein the computer-based automobile information management system comprises a system setting module, a basic information setting module, a service management module, and a report management module,
 wherein the service management module manages one or more of a registration service, a change service, a cancelling registration service, a vehicle real-time positioning service, a vehicle real-time control service, a vehicle real-time information monitoring service, a vehicle information safety service, a driving recording service, a bank service, an Electronic Toll Collection (ETC) service, a payment service, and traveling route service.

\* \* \* \* \*